Jan. 12, 1971 T. MAXON 3,554,700
METHOD FOR OBTAINING A KNOWN VOLUME OF LIQUID AND ABSORPTION
APPARATUS THEREFOR
Filed May 6, 1968 2 Sheets-Sheet 1
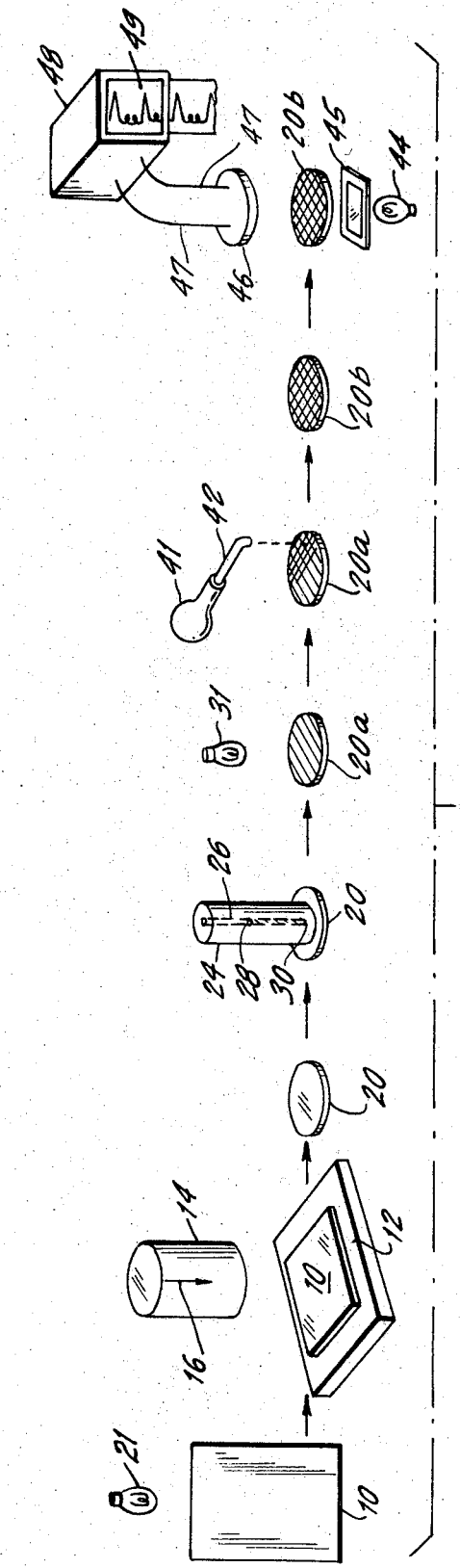
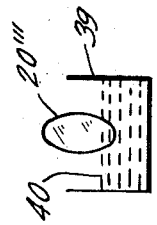
FIG. 4.
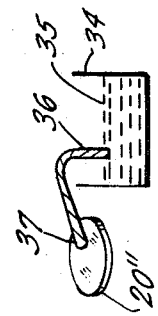
FIG. 3.
FIG. 2.
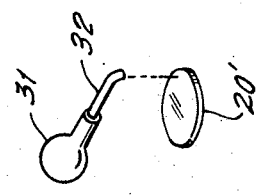
INVENTOR
THEODORE MAXON
BY
OSTROLENK, FABER, GERB & SOFFEN
ATTORNEYS Jan. 12, 1971   T. MAXON   3,554,700
METHOD FOR OBTAINING A KNOWN VOLUME OF LIQUID AND ABSORPTION
APPARATUS THEREFOR
Filed May 6, 1968   2 Sheets-Sheet 2
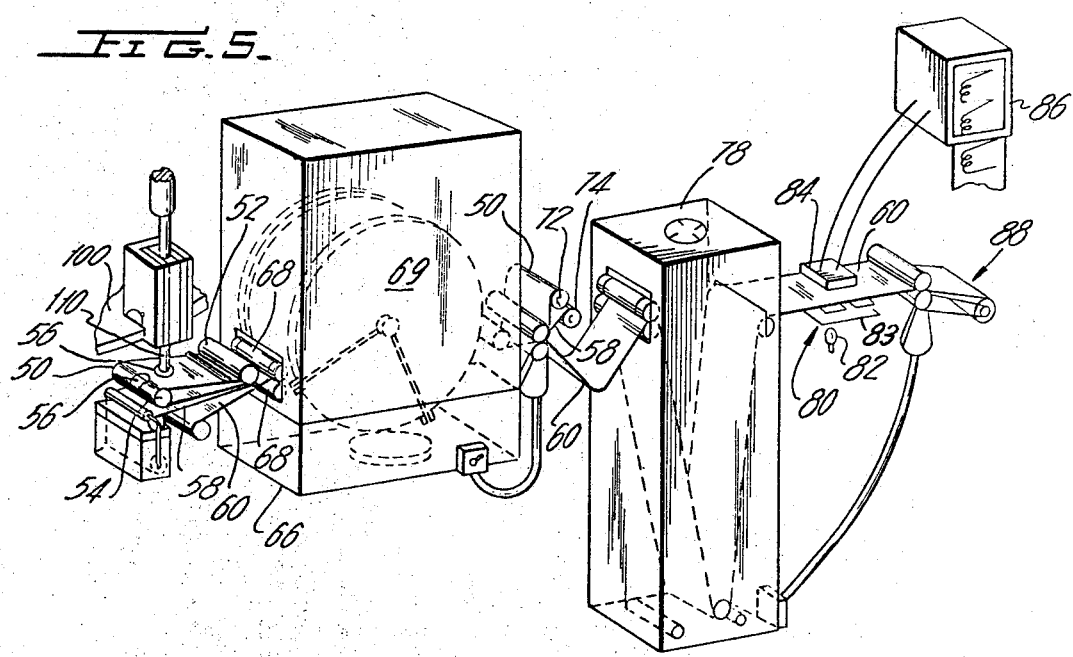
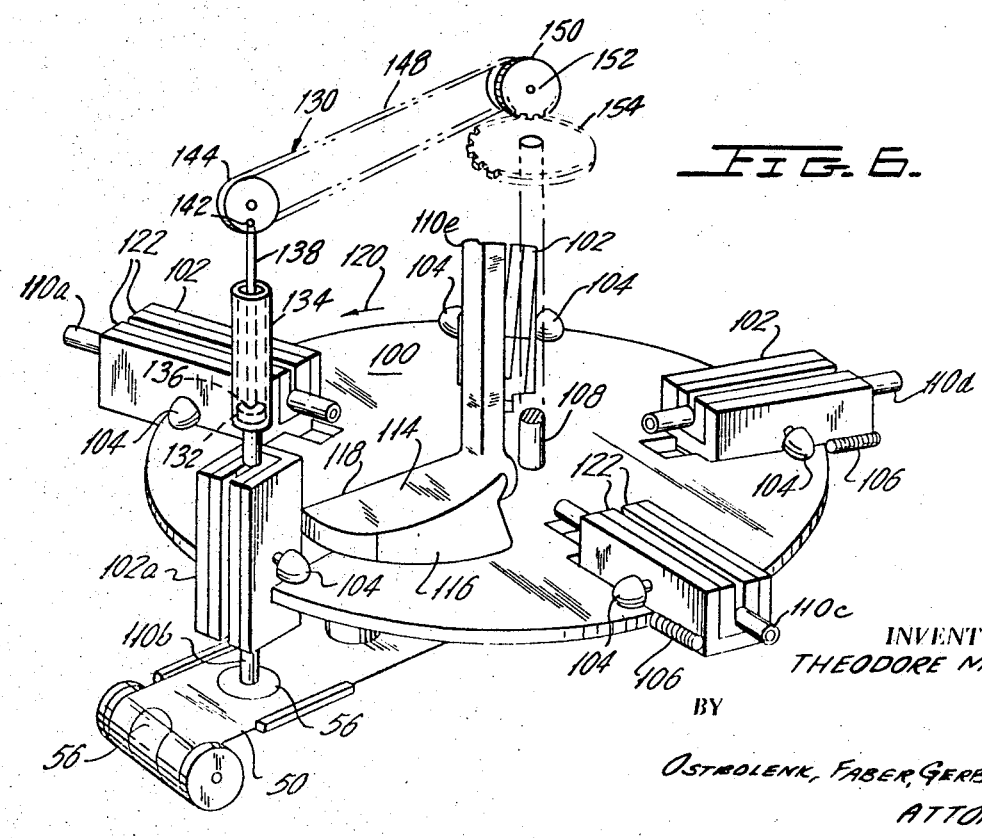
INVENTOR.
THEODORE MAXON
BY
OSTROLENK, FABER, GERB & SOFFEN
ATTORNEYS United States Patent Office 3,554,700
Patented Jan. 12, 1971

1

3,554,700
METHOD FOR OBTAINING A KNOWN VOLUME OF LIQUID AND ABSORPTION APPARATUS THEREFOR
Theodore Maxon, Elmhurst, N.Y., assignor to Scientific Industries, Inc., Hempstead, N.Y., a corporation of Delaware
Filed May 6, 1968, Ser. No. 726,652
Int. Cl. G01n 1/00, 1/28; B65b 43/42
U.S. Cl. 23—230                                    18 Claims

ABSTRACT OF THE DISCLOSURE

For obtaining a predetermined volume of liquid, a pad of predetermined volume is formed which is comprised of a material of known absorption characteristic, liquid is then applied to the pad until the pad is saturated; since a known volume pad is known to absorb a certain quantity of liquid per unit volume, the volume of liquid on a saturated pad is known; apparatus is provided for carrying out the foregoing method; this method may be used for analysis of the components of a liquid, through applying a reagent to the saturated pad and analyzing the reaction caused by the reagent on the pad.

---

This invention relates to a method for obtaining a predetermined volume of liquid and to an apparatus therefor, and more particularly relates to a method for obtaining a known volume of liquid by providing an absorbent pad of known absorption characteristics and of predetermined volume and then saturating said pad, whereby it will be holding a predetermined volume of liquid; and an apparatus therefor.

For performing a quantitative analysis of a component of a liquid sample, it is necessary to have a known volume of that liquid sample available. Conventionally, a known volume of liquid sample is obtained through the use of a container for the liquid sample which is marked with graduations stated in terms of the liquid volume which would fill that portion of the vessel or container between two graduations. Then, when liquid is placed in the vessel or container and fills the volume between two graduations, the vessel or container contains a known volume of liquid.

This method of obtaining a known volume of liquid has a number of drawbacks. Usually, an operator must visually or by means of an automatic sensing means determine when the vessel or container has been filled up to a predetermined point or up to a predetermined graduation mark. This requires that time be spent by the operator in visually studying the container or requires that an extra sensing apparatus be used to obtain the known volume. For visual observations, the container must be marked with graduations, e.g. by scoring, which makes the manufacture of a container more expensive. Furthermore, with visual observations, human error possibilities are introduced resulting from fatigue, parallax effects, faulty memory, etc.

The present invention provides a simple method for obtaining a known volume of liquid, without requiring visual observation of the container for the liquid, or graduations or other markings on the container, or sensing means to sense when a container is filled with a particular volume of liquid. Basically, a material having a known absorption characteristic, i.e. the ability to absorb a predetermined volume of liquid sample for each unit volume of absorbent material, is formed into a pad of known volume, whereby the pad, when saturated, will contain a known volume of liquid sample.

The method of the present invention may be employed in conjunction with the quantitative analysis of a component of a liquid sample, wherein the absorbent pad absorbs liquid sample until saturated, is dried, and absorbs a reagent until saturated. The reagent on the absorbent pad reacts with a component of the liquid sample. The order in which sample and reagent are applied to the pad may be reversed, and after reagent is applied, the pad would have to be dried. The pad is thereafter passed into an analyzing means which studies the results of the reaction between sample component and reagent.

A modification of this method involves providing a known volume of sample on an absorbent pad and then transferring the contents of the pad, e.g. by squeezing the pad, onto a supporting medium which is supporting reagent to be reacted with the component being measured in the liquid sample. A known amount of pressure on a pad of particular dimension holding a known amount of liquid will transfer a known amount of sample to the reagent supporting medium.

The provision of an apparatus which will apply liquid sample to the absorbent pad until the pad is saturated, and which will then automatically cease to apply further liquid sample to the pad, to prevent its becoming supersaturated, ensures that the pad will be holding only the predetermined volume of liquid.

Accordingly, it is a primary object of the present invention to provide a method for obtaining a predetermined volume of liquid sample.

It is another object of the present invention to provide a method for obtaining the volume of liquid sample without requiring visual observation of the sample container and without requiring a separate sensing means for sensing when the desired volume has been obtained.

It is another object of the present invention to provide such a method which merely requires the provision of a pad of known absorption characteristic and of known volume to which liquid is applied until the absorbent pad is saturated.

It is another object of the present invention to provide a method for quantitatively analyzing a component of a liquid sample.

It is another object of the present invention to provide an apparatus for providing a predetermined volume of liquid sample without a requirement for visual observation of the container or for a sensing means for sensing when the container holding liquid sample contains that predetermined volume.

It is another object of the present invention to provide such an apparatus which provides an absorbent pad of known absorption characteristics and of known volume and a means for applying liquid sample to the absorbent pad until it is saturated.

It is a further object of the present invention to provide an apparatus for applying liquid sample to an absorbent pad until the pad is saturated and then halting the application of sample.

These and other objects of the present invention will become apparent when the following description is read in conjunction with the accompanying drawings, in which:

FIG. 1 schematically illustrates the steps in the method of the present invention and illustrates one form of apparatus for practicing the invention;

FIGS. 2–4 show alternate apparatus for applying liquid sample to an absorbent pad in accordance with the teachings of the present invention;

FIG. 5 shows a chemical analysis apparatus in conjunction with which the present invention may be used; and FIG. 6 is a detail of a part of the apparatus of FIG. 5, showing the manner of application of liquid sample to absorbent pads.

To carry out the method of the present invention, a pad of absorbent material is provided having a known absorption characteristic, i.e. the capacity to absorb, until saturated, a known volume of liquid sample per unit volume of absorbent material.

The material of which absorbent pads to be used in conjunction with the present invention are formed may be chosen from one of the following: absorbent or filter paper of a standardized absorption characteristic; a textile woven uniformly, and comprised of one or more of, e.g. cotton, wool, rayon, nylon; cellulose; artificial polyethylene plastic sponge material; porous ceramic, or any other absorbent material which may be formed as needed.

Turning to FIG. 1, a block or sheet 10 of absorbent material is provided. Sheet 10 is placed on a platform 12 and a punch, or disc cutting element 14 is moved in the direction of arrow 16 to cut a pad 20 from the sheet 10. While cutting or punching is suggested, any other manner of separation of an absorbent pad from a block or sheet of material may be used. While item 10 is shown as a sheet of absorbent material, a block of material may be used and a cutting means may separate absorbent pad elements from the block.

While a single cutting means 14 is shown, it is apparent that any number of cutting or separating means may be provided. The present invention may be carried out using only one absorbent pad. However, it is anticipated that both the method and the apparatus of the present invention will often be used in a system where a large number of absorbent pads, each for holding a separate liquid sample, would be required. For example, the invention could be used in an analyzing unit where a plurality of samples taken from different sources are analyzed in sequence. Naturally, each absorbent pad would have to be of known volume. This is most readily accomplished by forming each absorbent pad with identical dimensions.

The cutting or separating means for forming absorbent pad 20 must be adapted to form absorbent pads of uniform volume. Assuming that element 10 is a sheet of material and that the sheet has uniform thickness, punch 14 must merely cut pads of uniform surface area to ensure that uniform pad volume requirements are met.

After its formation, absorbent pad 20, which is now of known volume, is capable, until it becomes saturated, of absorbing a known volume of liquid sample. The sheet from which the pad 20 was taken or the pads themselves were stored in a location where they absorbed a certain amount of moisture from the atmosphere. The capacity of pad 20 to absorb more liquid is reduced to the extent of the liquid aborbed. One important use for the present invention, as will be discussed in conjunction with FIGS. 5 and 6, is for quantitatively analyzing a liquid sample for a component thereof. Once the sample is applied to a pad and has reacted, as will be described, with a reagent, the reaction is compared with a known standard. So long as the pad 20 in which the reaction is being measured and the standard of comparison were stored under similar conditions or are adjusted for storage conditions, the decrease in the absorption ability of pad 20 due to prolongation of storage before use is of no significance.

Furthermore, where, as in FIGS. 5 and 6, a number of pads 20 are used in sequence, so long as the pads 20 were stored under uniform conditions before use, the pads are uniform and the effects of the storage on comparative results are cancelled out. Here, therefore, while the amount of liquid sample being held is not known, the volume is known, in the sense that there is predictably the same amount being held by all the pads.

However, where it is desired to obtain a known amount of liquid sample through employment of the present invention, all liquid within the pad prior to its use must be eliminated. The absorbent material is dried, e.g. by heating means 21, so that it will be able to absorb a full charge of liquid sample. The drying operation is illustrated as being performed prior to formation of separate absorbent pads, but may be performed after the pads are formed, or at any time prior to the application of liquid sample to the absorbent pads.

After formation of a pad 20, the next step in the inventive method is to move the absorbent pad into contact with a liquid sample which it will absorb.

A first, and most preferred, method of applying liquid sample to an absorbent pad 20 is shown in FIG. 1. A conventional capillary tube 24, which is comprised of glass or other rigid material, is provided. Capillary 24 has a passage 26 of small cross-sectional area extending longitudinally completely therethrough for holding a supply of liquid sample 28. Once the liquid sample 28 has been drawn into the capillary, e.g. by capillary action or by being sucked into the capillary, it remains within passage 26 because the cross-sectional area of the passage is sufficiently small that the surface tension of the liquid sample within the capillary holds the sample in the passage and does not permit it to prematurely leak out.

The liquid sample 28 within passage 26 reaches to at least one open end 30 of capillary passage 26, which may be the end through which the liquid sample first entered the passage. The end 30 of the capillary 24 to which the liquid 28 extends, is brought into direct contact with the surface of absorbent pad 20. The liquid contacts the absorbent pad 20 and the surface tension of the liquid is broken. The absorbent pad draws liquid out of the capillary. One or more than one capillary tube may be used to apply liquid to disc 20. More liquid than the volume of liquid which absorbent pad 20 is capable of absorbing, up to saturation, should be made available to be absorbed by the pad.

After the pad has become saturated, as the pad marked 20a already is, the pad 20 is incapable of absorbing and, therefore, does not absorb more liquid. Since no liquid within passage 26 is being drawn out of the passage, the saturated pad 20 is at equilibrium with the contents of the capillary 24. The capillary 24 is to be held in contact with pad 20 until a sufficient time has passed that there can be assurance that the pad 20 has become saturated. The capillary is then removed from pad 20. The time of removal of the capillary is not critical, since no more liquid sample will be drawn from the capillary once the pad 20 has become saturated.

There are other apparatus for transferring liquid sample to pad 20 until the pad becomes saturated. These are illustrated in FIGS. 2 and 4. It is to be understood, that the alternate apparatus are shown for illustrative purposes and that any apparatus which applies liquid sample to an absorbent pad until the same becomes saturated may be used in conjunction with the present invention.

FIG. 2 shows a second form of apparatus for applying liquid sample to an absorbent pad. Pad 20′ is formed in the same manner as pad 20. A squeeze bulb or other liquid storage means 31 has been provided for holding liquid sample to be dispensed to pad 20′. Liquid sample is drawn out of a receptacle (not shown) through tube 32 by squeeze bulb 31. The squeeze bulb and tube combination 31, 32 is moved to where the liquid sample within squeeze bulb 31 may be forced out of bulb 31, through tube 32 to drip, fall or pour onto pad 20′. The liquid sample is applied until pad 20′ becomes saturated. The saturation point may be determined by observing when further liquid is not absorbed by pad 20′, but instead remains on the surface thereof in the form of droplets or falls or drips off the pad 20′. Alternatively, an excess amount of liquid may be permitted to fall on pad 20′, and then the pad can be permitted to drop off, or can otherwise have the excess liquid removed from it. The saturated pad then holds a known liquid volume.

A third form of apparatus comprises a combination of the apparatus of FIGS. 1 and 2. The pad 20′, which is now holding or which has on its surface an excess amount of liquid sample, is brought, as shown by pad 20 in FIG. 1, into contact with the end of an empty or partially filled capillary 24. The capillary will take up the excess liquid from the pad 20' by capillary action and will cease the uptake when the liquid volume on the pad decreases to the pad saturation level. The liquid in the capillary is then in equilibrium with the liquid on the pad. The capillary is held in contact with pad 20' until there can be assurance that the pad is no longer holding excess liquid. Since no further liquid transfer occurs once equilibrium is reached, the period of time during which the capillary must be held against the pad is not critical, so long as it is longer than the period required to reach equilibrium. When the capillary is removed, pad 20' is saturated.

A fourth form of apparatus for applying liquid sample to an absorbent pad 20'' is shown in FIG. 3. Pad 20'' is formed in the same manner as pad 20. A vessel 34 filled with liquid sample 35 has a wick 36, comprised of absorbent material, dipped into it. The wick may be comprised of any of the materials of which the absorbent pad 20'' may be comprised, and make take the form of an elongated thin string or any other form which permits transmission along wick 36 of liquid sample from container 34 to pad 20''. Wick 36 is in contact at 37 with pad 20''. Liquid 35 travels along wick 36, as the wick absorbs the liquid. When the liquid on wick 36 contacts pad 20'', pad 20'' absorbs liquid from wick 36. The absorption by both wick 36 and then by pad 20'' continues until both of them are saturated, and then halts. The period of time allowed for the absorption process must be sufficient to permit both the wick 36 and the disc 20'' to become saturated and may be permitted to be longer than this. After the disc 20'' is saturated, the wick 36 is separated from it and saturated pad 20'' is holding a known volume of liquid sample.

FIG. 4 illustrates still another apparatus for transferring liquid sample to an absorbent pad 20''', which pad is formed of the same material and in the same manner as pad 20. A container 39 holds liquid sample 40 which is to be transferred to pad 20'''. Pad 20''' is dipped into the liquid sample 40 and is held there, either partially or totally submerged, until it has absorbed sufficient liquid sample to become saturated. Pad 20''' is then removed from the liquid sample 40. Excess liquid which was not absorbed by the pad is permitted to drip from the pad or is shaken off the pad or is otherwise removed therefrom, e.g. by the third form of apparatus discussed above. The now saturated pad contains the known volume of liquid sample.

Returning to FIG. 1, at 20a, pad 20 is saturated and, because pad 20 is of known volume and has a known absorption characteristic, it is holding a known volume of liquid sample.

In the event that it is desired to quantitatively analyze the liquid sample for the presence of a particular component, further operations may be performed on the liquid sample filled pad. Reagent would be applied to the pad, for instance. To obtain a desired reaction and produce a meaningfully measurable result, the reagent applied must be of a known volume. Accordingly, pad 20a is dried, e.g. by heating means 31. Then the pad may be saturated with reagent in liquid form and will be able to hold only the known volume of reagent required to saturate it.

In some situations, the volume of reagent added will not be critical and a drying means will not be necessary to ensure that only a known volume of reagent is applied to the pad.

As illustrated in FIG. 1, a squeeze bulb 41 having a tube 42 therewith connected is filled with a reagent stored in a vessel (not shown), which reagent is capable of reacting with a component of the liquid sample for producing a measurable reaction, the intensity of which reaction will depend upon the quantity of the particular component in the portion of the liquid sample absorbed in pad 20a. The apparatus illustrated for applying reagent is that shown in FIG. 2. It is to be understood that any of the other apparatus may be used to apply reagent.

For example, if pad 20a is saturated with a sample of human blood, and it is desired to measure the quantity of sugar in the blood sample, a reagent, such as Fehling solution would be poured, dipped or otherwise applied to the pad 20a, and would react with whatever sugar was present in the sample. Fehling solution is a conventional reagent for testing sugar, is comprised of cupric sulfate, sodium potassium tartrate and sodium hydroxide, is described with greater particularity in The Van Nostrand Chemical Dictionary (1953) p. 283, and produces a blue colored substance when it reacts with sugar.

When the pad 20 changes color or otherwise changes under the influence of the reaction between the component and the reagent, the pad will be as at 20b.

The liquid sample is uniformly spread throughout pad 20. Therefore, the substance being tested for e.g. sugar, is also uniformly spread throughout the pad. When a reagent is applied to the pad, e.g. to change its color, the greater the concentration of the substance being tested for in the liquid sample, the more intense will be the color produced by the reaction with the reagent. For example, if a quantitative analysis is being made of sugar in a blood sample, since the Fehling solution reagent reacts with the sugar to form a blue color substance, and the concentration of the blue substance produced will vary as the concentration of the sugar in the sample, determination of the intensity of the blue color will determine the sugar concentration.

The above description assumed that the substance being analyzed would be the first item to contact the pad and that the reagent would contact the pad later. This may be reversed, however, and the reagent may be applied before the sample. The manner of application of sample and reagent can be exactly that described in connection with FIG. 1. Alternatively, the pad 20, of a plurality of pads 20, if a number of pads are used, may be impregnated with reagent long before they have sample applied to them. The reagent may be applied at the time sheet 10 is formed or shortly after pads 20 are formed and the sheet 10 or the pads 20 would then be stored in their impregnated conditions until the pads are needed for analysis purposes.

If a liquid reagent is used, to ensure that all pads are provided with a uniform predetermined volume of reagent, the pads are saturated with reagent. Before storage and/or before use, the pads may be dried to enable them to again be saturated, this time with a known volume of sample. Thus, the reagent impregnated pads will all absorb the same amount of sample until saturated.

When the pad 20 is treated with sample and reagent and a reaction has taken place, the reaction is then analyzed.

Still another way of accomplishing the analysis of a liquid sample is illustrated by FIGS. 5 and 6, to be considered further below. A support medium for reagent is treated with reagent so that it is holding same. The reagent may be at a predetermined concentration. Then, a pad saturated, as described above, with sample only, has the sample thereon transferred, e.g. by squeezing to the reagent support medium. With a predetermined squeezing pressure applied, the amount of sample transferred is predictable. With a plurality of pads of equal volume being squeezed, the amount of sample transferred from each is identical. Upon the movement of the sample on the pad to the reagent, a reaction takes place that can be analyzed and measured.

As a further example, the pads may be wrung into a container filled with a predetermined volume of reagent, and if each pad has the same pressure applied to it, each reagent filled container will receive the same sample volume.

Returning to FIG. 1, light from source 44 is shone through filter 45 and then through pad 20, which has been treated as at 20b. Instead of light being shone through pad 20 which is illustrated, light may be reflected off the surface of pad 20. The intensity of the light which is either transmitted or reflected is sensed in light sensing device 46, which device may be a conventional photocell. Device 46 sends out an electric signal that is proportional in voltage to the intensity of the light shining on it.

Filter 45 has a single section colored in a color complementary to that of the reaction being tested for, which will block the passage through the filter of light which is the color of the reaction. The more intense in the reaction, the more intense is the color produced on the pad 20, and the more this color dominates in the pad color. When light which is missing the color of the reaction on the pad hits the pad, the more intense was the reaction, the less intense is the light that will pass through or be reflected off pad 20 to sensing device 46. The light sensed by device 46 is compared with a standard, the results of which comparison show the intensity of the reaction. The difference between the standard and the signal from the reaction may be expressed in terms of the color of the pad and in terms of the concentration of the component being tested for.

Sensing device 46 is connected by lead wires 47 with recorder 48 which keeps a graphic record of the light intensity, measured over time. Recorder 48 contains a stylus whose position is shifted, depending upon the voltage passing from device 46 to recorder 48. A slowly moving sheet of paper 49 passes in contact with the recorder stylus. The scribing of the stylus on the paper records the position of the stylus over time, whereby a record of the light intensity over time is made.

There has just been described a novel method for quantitatively analyzing a liquid sample for the presence of a particular component, and an apparatus for carrying out this method. Modifications of the method and the apparatus for carrying out the method will now be apparent to those skilled in the art.

FIG. 5 illustrates an automatic chemical analyzer, as shown in U.S. Pat. No. 3,036,893, issued on May 29, 1962 to Samuel Natelson, and assigned to the assignee hereof. The apparatus schematically illustrated in FIG. 1 herein may be used in conjunction with the analyzer shown in FIG. 5 herein. The analyzer of FIG. 5 is shown in use with capillaries for holding liquid samples to be transferred to absorbent pads. However, any of the apparatus of FIGS. 2–4 or any other apparatus may be used to apply liquid sample to the absorbent pads. The analyzer will now be described with the apparatus of the present invention incorporated in it.

Broadly, the analyzer utilizes three elongated tapes. The top or sample receiving tape 50 feeds off reel 52 toward roller 54 around which it passes as it moves toward the transfer zone 66, to be described. The tape 50 carries a plurality of absorbent liquid sample receiving pads 56 of uniform predetermined volume and absorption characteristic, each of which, in turn, receives, until saturated, sample dispensed by one of the capillaries. The capillaries are each moved into position to dispense their contents in a manner to be described. A tape of transfer medium 58 moves between the sample receiving tape 50 and the analysis tape 60. Tape 60 may be treated with a reagent which reacts with the sample transferred to that tape.

Once sample has been applied to saturate a pad 56, in a manner to be described, the three tapes move into the transfer zone 66 where they are pressed together by rollers 68 and drum 69 and the sample on the pad 56 in the transfer zone is squeezed through transfer medium 58 onto the analysis surface of tape 60. Pressure on each pad 56 is uniform. Each pad is identical and holds an identical volume of sample. Hence, an identical and predictable volume of the sample on each pad 56 is squeezed through tape 58 to tape 60.

All three tapes exit from the transfer zone 66 and the tapes 50 and 58 are respectively taken up on take-up reels 72 and 74. The analysis tape 60, however, passes into the treatment zone 78 where the tape may be treated with a reagent, if it has not already been so treated, or the tape may be washed, heater, dried or otherwise treated to bring about the desired reaction between the material being tested and the reagent.

The treated tape 60 then moves to a reading zone 80 where, for example, a light 82 is shined through a filter 83 and through tape 60. The resulting light is sensed by sensing means 84 which sends a signal to recording means 86 that records the signal. The light signal transmitted to sensing means 84 will vary depending upon the type of reaction and the extent of the reaction occurring between the reagent and the sample being tested. After tape 60 has been read, it moves to the tape take-up zone 88 where it is wound up.

Turning to FIG. 6, a circular plate 100 is provided which has a plurality of capillary carriers 102 positioned thereon and facing radially outward therefrom. Each of the capillary carriers 102 is mounted to the plate 100 by pivot bearings 104 which permit the capillary carriers to be tilted upward in a manner to be described. The capillary carriers 102 are normally untilted and extend parallel to the surface of plate 17. The compression springs 106 connected between the edge of plate 100, on the one hand, and a pin on the carriers 102, on the other hand, normally bias the capillary carriers flat with respect to plate 100.

The plate 100 is secured to a shaft 108 which is secured to a rotating motor means (not shown) which is synchronized with the operation of the means drawing the tapes 50, 58, 60 through the chemical analyzer so that the capillaries are brought to the position where they discharge their contents on the tape 50 in proper synchronism with the movement of the tape 50.

Fixedly supported upon a shaft 112 and stationary with respect to the chemical analyzer is the capillary holder tilting means 114. The tilting means has a cam 116 on one side thereof and a cam 118, not shown, but corresponding to cam 116, on the other side thereof. The cams 116 and 118 tilt inward and upward. When the plate 100 is rotated, e.g. counterclockwise in the direction of arrow 120, as each capillary holder 102 moves into engagement with the cam 114, the capillary holder is tilted vertical, as illustrated with capillary holder 102a. Each of the capillary holders 102 has a capillary 110a, b, c, d or e, etc. mounted therein.

Each capillary holder 102 includes a support means 122 for the capillary, e.g. resilient pads which have a slot therebetween into which the capillary 10 is fitted. The pads 122 grip the capillaries, but do not hold them so tight that a pressure means, to be described, is incapable of moving these capillaries axially so that the ends of the capillaries are each able in turn to contact an absorbent pad 56.

As each of the capillary holders 102 is tilted and each of the capillaries 110 becomes vertical, as illustrated with capillary 10b in FIG. 6, the lower end of the capillary is over an absorbent pad 56 to be saturated with the sample in the capillary.

As was noted above, the liquid sample is drawn into the capillary through one end thereof. After the intake of liquid sample ceases, the liquid sample in the capillary will normally extend to that end of the capillary. It may also extend to the other end if, for instance, the capillary is completely filled or it is inverted and the liquid therein flows to the other end. When the absorbent pad contacts the end of the capillary to which the liquid extends, it will also contact the liquid sample within the capillary and draw the sample out. When the capillaries 110 are mounted in their respective capillary holders 102, the capillaries should be mounted so that their ends through which the liquid samples are to exit from the capillaries face radially outward on disc 100. The capillaries are tilted so that their radially outward ends are the ones that are directed toward the absorbent pads. Hence, the above described manner of positioning the capillaries in their respective capillary holders will ensure that the liquid samples may be transferred from each capillary to a respective absorbent pad.

A pressure applying means 130, shown somewhat schematically, is provided, comprising a piston 132 located within a support cylinder 134 that is in turn, supported by a means (not shown) on the analyzer. Piston 132 is pivotally connected at 136 to a linking rod 138 which is in turn connected at 142 with a crank wheel 144 that is in a vertical plane. Wheel 144 is mounted at its center 146 on a support (not shown). Wheel 146 is rotated by belt 148 which connects wheel 146 with pulley 150 also in a vertical plane. Pulley 150 is, in turn mounted on a shaft 152 that is connected by an appropriate gear arrangement 154 to be rotated by the means which rotates shaft 108. (As schematically illustrated, gear 154 is horizontal and is on shaft 108.) The gears are chosen to control the rate of rotation of pulley 150 with respect to the rotation rate of shaft 108 so that the piston 132 will move down over each capillary 110 just after that capillary has been tilted. As has previously been mentioned, the rate of movement of tape 50 bearing pads 56 also is synchronous with the rate of rotation of shaft 108. When shaft 108 halts, so does tape 50.

When each piston 132 presses on one end of a capillary 110 and moves its opposite end into contact with the absorbent pad 56, the pad absorbs the liquid sample from within the capillary, until the pad has been saturated.

Shaft 108 should rotate in a halting manner and should come to a stop when piston 132 is pressing the end of a capillary against a pad 56, so that when liquid sample is being transferred from each capillary 110 to an absorbent pad 56, the pad will be stationary and the capillary will be held in contact with the pad for a sufficient period of time to enable the pad to become saturated.

Once the capillary has been emptied, the shaft 108 will again rotate and piston 132 will move upward out of engagement with the capillary it was pressing upon. The resilient capillary holding pads 122 will retract the capillary from its pad 56 just enough so that the capillary will not interfere with the rotation of disc 100. A new pad 56 and a new capillary 110 will each move into position for the next one of the above described sample transfer operations.

There has just been briefly described an automatic chemical analyzer with which the apparatus of the present invention may be used. It is to be understood that an apparatus of the present invention may be used in any application where a measured amount of liquid sample must be provided.

The method of the present invention permits a predetermined volume of liquid sample to be readily obtained without sample volume measuring devices or visual observation of sample volumes being required. An apparatus which may be used for the performance of the method of the present invention enables a measured volume sample to be made available without special preparation of a volume graduated sample container and without visual or mechanical volume sensing means being employed.

Although there has been described a preferred embodiment of the novel method of the present invention and a number of apparatus designed in accordance with the invention, many variations and modifications will now become apparent to those skilled in the art. Therefore, this invention is to be limited, not by the specific disclosure herein, but only by the appended claims.

The embodiments of the invention in which an exclusive privilege or property is claimed are defined as follows:

1. A method for providing a predetermined volume of liquid sample comprising the steps of
providing absorbent material having a known absorption characteristic, which characteristic consists of the ability to absorb until saturated a predetermined volume of liquid for a predetermined volume of absorbent material,
forming a separate pad of the material having a predetermined volume; and
applying liquid sample to the separate pad of material until it is saturated, whereby the pad contains a known volume of sample.

2. The method for providing a predetermined volume of liquid sample of claim 1, wherein liquid sample is applied to the pad of material by filling a capillary tube with an excess of liquid sample above the amount of sample that will be absorbed by the absorbent pad of material; and then touching one open end of the capillary to the absorbent pad, whereby the absorbent pad will draw liquid sample from within the capillary and continue to withdraw sample therefrom until the absorbent pad is saturated; and the capillary thereafter is removed from the absorbent pad.

3. The method for providing a predetermined volume of liquid sample of claim 1, wherein the liquid sample is applied to the absorbent pad by dropping liquid sample onto the absorbent pad.

4. The method for providing a predetermined volume of liquid sample of claim 1, wherein the liquid sample is applied to the absorbent pad by dipping the pad into a container of liquid sample until the pad is saturated, and then removing the pad from the container of liquid sample and removing the excess sample from the pad.

5. The method for providing a pretermined volume of liquid sample of claim 1, wherein the liquid sample is applied to the absorbent pad by a wick, comprised of a material which transmits liquids, which has one portion thereof in a container of liquid sample and another portion thereof in contact with the absorbent pad, whereby liquid sample from the container will be transmitted from the container through the wick to the pad until the pad is saturated, when no further liquid will be absorbed from the wick by the pad;
then the wick is separated from the pad.

6. The method for providing a predetermined volume of liquid sample of claim 1, wherein liquid sample is applied to the absorbent pad until and beyond the saturation point of the pad;
and then touching one open end of a capillary which is not filled to the pad, whereby the capillary will draw the liquid from the pad until the pad is only saturated; and the capillary is thereafter removed from the pad.

7. The method for providing a predetermined volume of liquid sample of claim 1, wherein the absorbent material is provided in a sheet and the separate pad is formed by separating a portion of the absorbent material from the sheet thereof.

8. The method for providing a predetermined volume of liquid sample of claim 1, wherein the absorbent material is dried prior to liquid sample being applied to it.

9. A method for providing a plurality of discrete pads each containing a predetermined volume of liquid sample, comprising the steps of
providing a plurality of pads of absorbent material, each pad being of a predetermined volume and being comprised of a material having a known absorption characteristic, which characteristic consists of the ability to absorb until saturated a predetermined volume of liquid sample for a predetermined volume of absorbent material; and
applying liquid sample to each separate pad until it is saturated, whereby each pad contains a known volume of liquid sample.

10. The method for providing a plurality of discrete pads each containing a predetermined volume of liquid sample of claim 9, wherein the plurality of absorbent pads is formed by providing a sheet of absorbent material and separating a plurality of absorbent pads from the sheet.

11. A method for analyzing the contents of a plurality of liquid samples comprising the steps of
providing a plurality of discrete absorbent pads, each containing a predetermined volume of liquid sample from one of said plurality of liquid samples, by means of the method of claim 10, wherein each absorbent pad holds a different one of the plurality of liquid samples;

moving the sample on each pad to where it can be acted upon by a reagent;

then treating each sample so moved with a reagent which reacts with a component of each liquid sample thereon;

and then analyzing each reaction.

12. The method of analyzing the contents of a plurality of liquid samples of claim 11, wherein reagent for treatment is provided by providing a reagent support medium to which reagent is applied, applying reagent in liquid form to the support medium, and drying the medium before liquid sample is brought into contact with it.

13. An apparatus for providing a predetermined volume of liquid sample, comprising a container filled with liquid sample, an absorbent pad comprised of material having a predetermined volume and having a known absorption characteristic, the latter being the ability to absorb a predetermined quantity of liquid sample per unit volume until said pad is saturated;

means for transferring liquid from said container to said absorbent pad until said absorbent pad is saturated.

14. The apparatus for providing a predetermined volume of liquid sample of claim 13, further including means for halting further transfer of liquid sample to said pad after it is saturated.

15. The apparatus for obtaining a predetermined volume of liquid sample of claim 14, wherein said container comprises a capillary means containing more liquid sample than can be absorbed by an absorbent unit, whereby said absorbent unit can become saturated by absorbing liquid sample from within said capillary means;

said capillary means having an end which is in contact with said absorbent pad; said capillary means having the liquid therein near the end thereof in contact with said pad, whereby the liquid in said capillary can be drawn out of it onto the absorbent pad and whereby said capillary serves as said means for transferring liquid.

16. An absorbent pad means for use with an apparatus which provides a plurality of separate liquid samples, with each sample being of the same volume, said absorbent pad means comprising a continuous strip of material having positioned upon it a plurality of spaced apart absorbent pads;

each said absorbent pad being comprised of material having a known absorption characteristic, which is the ability to absorb a predetermined quantity of liquid sample per unit volume until said pad is saturated;

each pad being of uniform volume;

whereby each pad will absorb the same quantity of liquid sample until saturated, and each pad will thereafter be holding the same volume of liquid sample.

17. The absorbent pad means of claim 16, wherein said continuous strip of material comprises an elongated tape having a surface; said absorbent pads being positioned at predetermined spaced intervals along said surface of said tape.

18. The method for providing a plurality of discrete pads each containing a predetermined volume of liquid sample of claim 10, wherein all of the absorbent pads are formed having an identical volume.

References Cited

UNITED STATES PATENTS

| | | | |
|---|---|---|---|
| 3,331,665 | 7/1967 | Natelson | 23—253 |
| 3,367,841 | 2/1968 | Buissiere et al. | 23—253TPX |

MORRIS O. WOLK, Primary Examiner

R. E. SERWIN, Assistant Examiner

U.S. Cl. X.R.

23—253, 259, 292; 141—130